Patented June 6, 1933

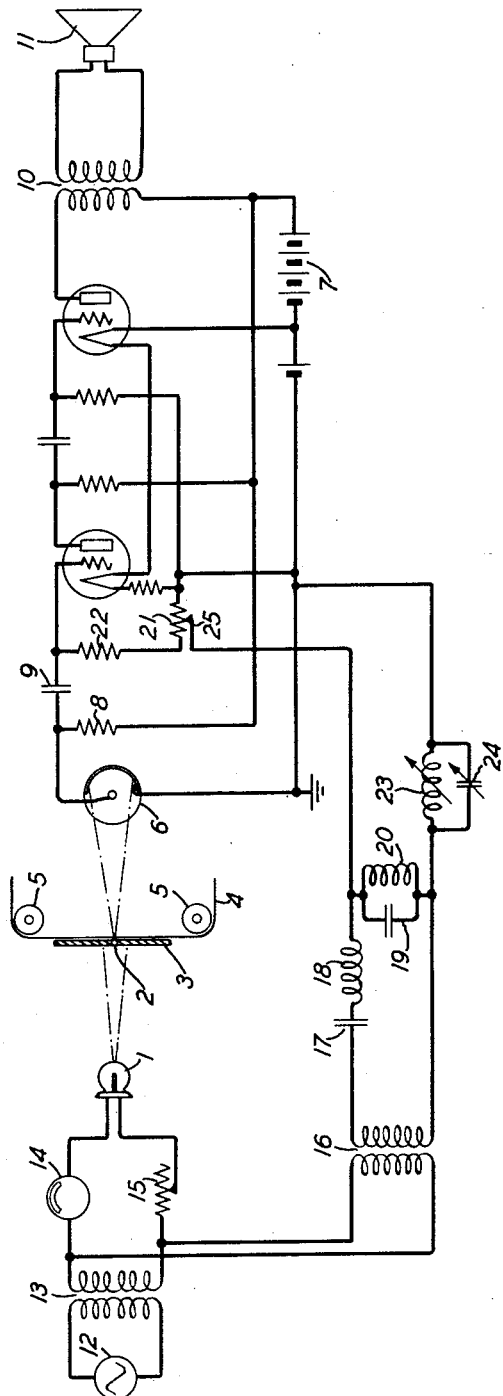

1,912,415

UNITED STATES PATENT OFFICE

LESLIE S. UPHOFF, OF LITTLE FALLS, NEW JERSEY, AND CARL H. RUMPEL, OF NEW YORK, N. Y., ASSIGNORS TO BELL TELEPHONE LABORATORIES, INCORPORATED, OF NEW YORK, N. Y., A CORPORATION OF NEW YORK

PHOTO ELECTRIC SYSTEM

Application filed March 30, 1931. Serial No. 526,322.

This invention relates to a method and apparatus for neutralizing an undesired component in the output of a light sensitive device.

In many systems for the communication of intelligence such as picture transmission systems and film sound reproducing systems, a light sensitive device is excited by a source of light modulated by some agency external to the source of light. The light sensitive device, which is generally some form of photoelectric cell, changes the variations in the light falling on the device into variations in an electric current passing through the device. To avoid fluctuations in the output of the device due to variations in the light emitted by the source, the light source has heretofore generally been an incandescent electric lamp operated from a source of power unvarying in magnitude, such as a storage battery. There are practical advantages to be secured, however, by the operation of such light source on alternating current but the use of alternating current in this way will normally result in the production in the current flowing in the device of an undesired component having twice the frequency of the alternating current supply.

The object of this invention is to neutralize the effect of undesired components in the output of a light sensitive device due to variations in the supply of power to the source of light exciting the device, without appreciably affecting desired components in the output of the device having the same frequency as the undesired components. For convenience of description the invention has been shown embodied in a system for reproducing sound from a film sound record, but the invention is not to be considered as limited to such a system as it will be apparent that the invention may be applied to many other systems.

An incandescent electric lamp having a short heavy filament operated on alternating current is used as a source of light to excite a light sensitive device such as a photoelectric cell. The output of the photoelectric cell will then contain an undesired component due to the variation in the light emitted by the lamp having a frequency twice the frequency of the alternating current. The output of the photoelectric cell is then generally amplified by a thermionic amplifier before being utilized. In accordance with this invention an alternating current derived from the source that supplies the lamp passes through a device which produces a current having a frequency double the frequency of the alternating current. This double frequency current is introduced at some convenient point into the output circuit of the photoelectric cell. By suitably adjusting the magnitude and phase of this double frequency current, the undesired component due to the variations in the light emitted by the lamp may be neutralized.

The drawing is a schematic showing of a film sound reproducing system embodying a form of the invention.

Light from the lamp 1 is directed on a narrow slit 2 in an opaque plate 3. A film sound record 4 is moved at constant speed past the slit 2 by the sprockets 5, 5, rotated in a known manner. The light from the lamp 1 passing through the slit 2 is modulated in accordance with the sound record and excites a light sensitive device 6. Current from the battery 7 flows through the resistance 8, thence through the device 6 back to the battery 7. The current flowing through the device 6 is varied in accordance with the variations in the light falling on the device 6, and a corresponding variation in voltage is produced between the ends of the resistance 8. This variation in voltage is applied through the condenser 9 to the input of a thermionic amplifier, which for convenience has been illustrated as a conventional two-stage resistance coupled amplifier. The output of the amplifier may be applied through a suitable transformer 10 to a sound reproducer 11. While a particular type of amplifier has been illustrated it will be apparent that other types of amplifiers and a greater or lesser number of stages of amplification may be used.

The lamp 1 is supplied with electric power from the alternating current source 12 through a suitable transformer 13. The current flowing in the lamp 1 may be read on a meter 14 and adjusted to any desired value by the resistor 15. Due to the use of alternating current for heating the filament of the lamp 1 and the thermal lag of the filament, the light emitted by the lamp 1 may be considered as composed of two components, a steady component of unvarying magnitude and a component varying at twice the frequency of the alternating current supply. This variable component of the light will produce a corresponding undesired component in the output of the photoelectric cell, which, if not neutralized, will produce a steady hum in the sound reproducer.

In the preferred embodiment of this invention, the effect of the undesired component in the output of the photoelectric cell is substantially neutralized by power obtained from the same source that produces the undesired component. Power from the alternating current source is supplied to a frequency doubling device 16. For convenience this device has been illustrated by a transformer so designed that the magnetic circuit is saturated during part of the cycle of the magnetizing current resulting in the production of a current in the secondary winding which is rich in harmonics. It will be understood, however, that other types of frequency doubling devices may be used and that the invention is not limited in any way to a specific type of device. The output of the device 16 is supplied to a band-pass filter which selects the harmonic which is double the frequency of the source and substantially rejects all other frequencies. Any suitable form of band-pass filter may be employed such as the well known type comprising a series capacitance 17 and a series inductance 18 followed by a shunt capacitance 19 and shunt inductance 20. The output of the filter is supplied to some convenient part of the output circuit of the photoelectric cell 6 and substantially neutralizes the undesired component in the output of the cell 6 without affecting desired components of the same frequency. A convenient method of introducing the filtered current into the output circuit of the cell 6 is by means of a potentiometer 21 in series with the grid leak 22 of the first amplifier tube.

A variable network comprising an inductance 23 and a capacitance 24 connected in series with the output of the band-pass filter provides a convenient method of adjusting the phase of the compensating current to produce the most advantageous degree of neutralization. The amplitude of the compensating current may be controlled by adjusting the slider 25 of the potentiometer 21.

What is claimed is:

1. In combination, a source of alternating current, an exciting lamp energized by said alternating current, a photographic record, means for moving said record through the light emitted by said lamp, a light sensitive device excited by the light passing through said record to produce an electric current having an undesired component of double the frequency of said alternating current, a frequency changer energized from said source of alternating current to produce a compensating current of double the frequency of said alternating current, an electrical network for controlling the phase of said compensating current, and means for introducing said compensating current into the output of said device to substantially neutralize the undesired component in the output of said device.

2. In combination, a source of alternating current, an exciting lamp energized by said current, a photographic record, means for moving said record through the light emitted by said lamp, a light sensitive device excited by the light passing through said record to produce an electric current having an undesired component due to said alternating current, a thermionic amplifier for amplifying the output of said device, a frequency changer energized from said source of alternating current to produce a compensating current of double the frequency of said alternating current, an electrical network for controlling the phase of said compensating current, and means for introducing said compensating current into the circuit of said thermionic amplifier to neutralize said undesired component.

3. In combination, a source of alternating current, a lamp energized by said current, a photographic record, means for moving said record through the light emitted by said lamp, a light sensitive device excited by the light passing through said record to vary an electric current and produce an undesired component due to said alternating current, a thermionic amplifier for amplifying the output of said device, a frequency changer energized by said source of alternating current to produce a compensating current of the same frequency as said undesired component, an electrical network for eliminating substantially all other frequencies from the output of said frequency changer, a second electrical network for adjusting said compensating current in phase opposition to said undesired component, and adjustable means for introducing said adjusted compensating current into a circuit of said amplifier in such magnitude as to substantially neutralize said undesired component.

4. In combination, a source of alternating current, a lamp energized by said alternating current, a photographic record, a light sensitive device excited by light from said lamp, means for moving said record to vary the light from said lamp exciting said device, a frequency changer energized from said source of alternating current to produce a current of double the frequency of said alternating current, and a network for introducing said double frequency current into the output of said device in proper phase and magnitude to substantially neutralize the undesired component in the output of said device due to the use of alternating current in said lamp.

In witness whereof, we hereunto subscribe our names this 27th day of March, 1931.

LESLIE S. UPHOFF.
CARL H. RUMPEL.